April 30, 1935. B. D. KUNKLE 1,999,297
HEAT INSULATED CONTAINER
Filed Dec. 30, 1932 3 Sheets-Sheet 1

INVENTOR
Bayard D. Kunkle
BY
Spencer Hardman and Fehr
his ATTORNEYS

April 30, 1935.  B. D. KUNKLE  1,999,297
HEAT INSULATED CONTAINER
Filed Dec. 30, 1932  3 Sheets-Sheet 2

INVENTOR
Bayard D. Kunkle
BY
Spencer Hardman & Fehr
his ATTORNEYs

April 30, 1935.  B. D. KUNKLE  1,999,297
HEAT INSULATED CONTAINER
Filed Dec. 30, 1932  3 Sheets-Sheet 3
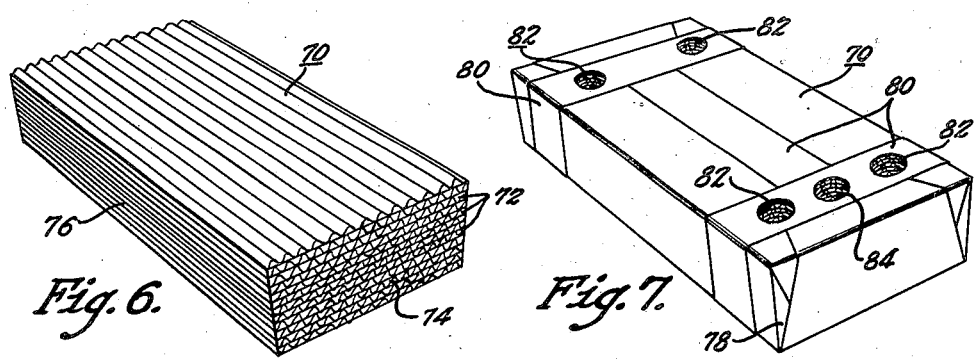
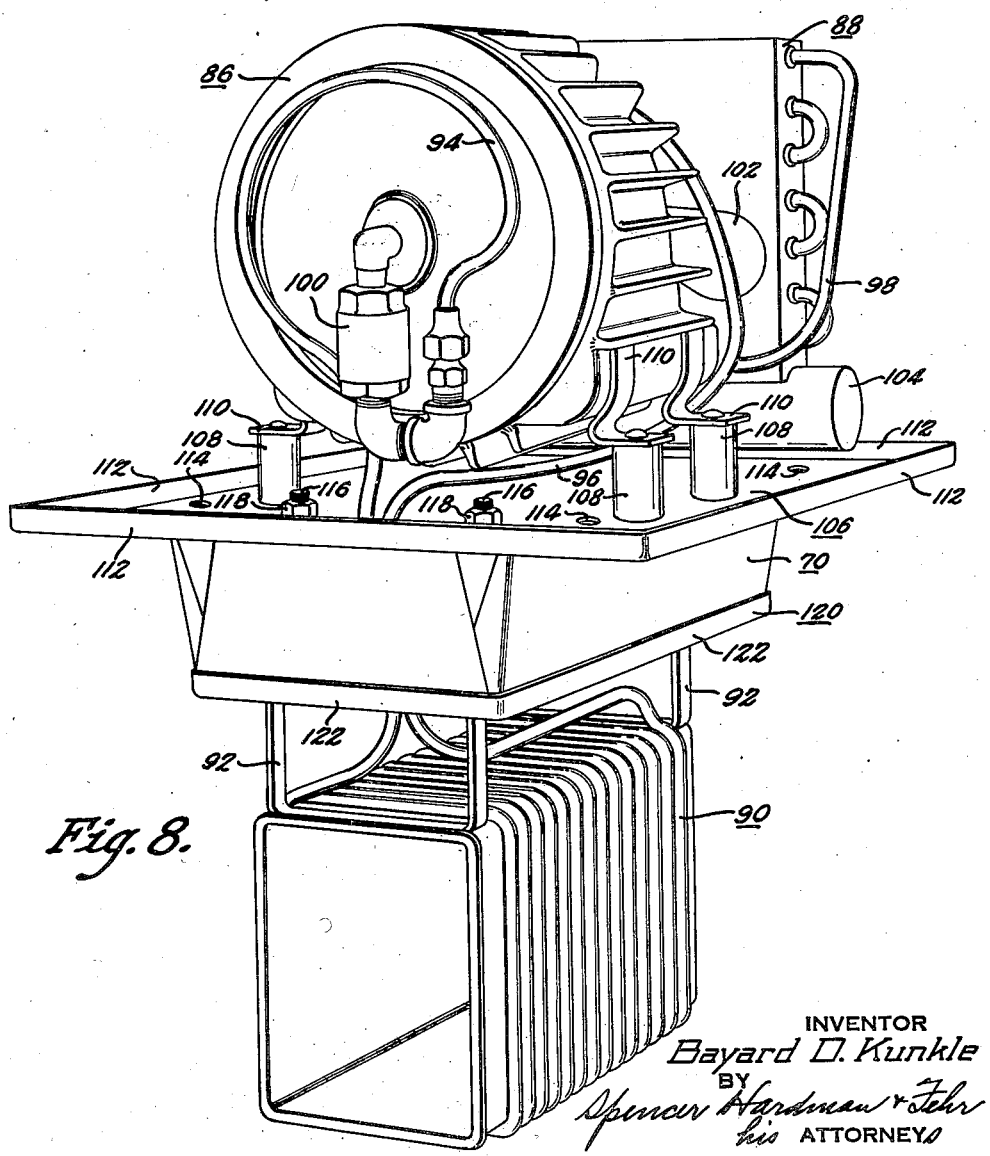
INVENTOR
Bayard D. Kunkle
BY
Spencer Hardman & Fehr
his ATTORNEYS Patented Apr. 30, 1935

1,999,297

UNITED STATES PATENT OFFICE 1,999,297

HEAT INSULATED CONTAINER

Bayard D. Kunkle, Dayton, Ohio, assignor, by mesne assignments, to General Motors Corporation, Detroit, Mich., a corporation of Delaware Application December 30, 1932, Serial No. 649,541

3 Claims. (Cl. 220—9)

This invention relates to a heat insulated compartment or container and the method of heat insulating such a compartment or container.

An object of this invention is to provide a heat insulated compartment or container which is convenient to build and low in production cost, as well as efficient and effective.

Another object of this invention is to provide a means of heat insulating a compartment or container that readily adapts itself to a convenient method of installing a temperature control unit therein.

Another object of this invention is to provide a heat insulated compartment having laminated heat insulating material.

Another object of this invention is to provide a method of manufacturing or producing a heat insulated compartment having laminated insulating material.

Another object of this invention is to provide a method of manufacturing or producing a heat insulated compartment, which method contributes to the convenience of building and low production cost thereof.

Further objects and advantages of the present invention will be apparent from the following description, reference being had to the accompanying drawings wherein a preferred embodiment of one form of the present invention is clearly shown.

In the drawings:

Figs. 6 and 7 are perspective views showing the construction of heat insulating plugs upon which the temperature control unit is mounted in a preferred form of the present invention.

Fig. 8 is a perspective view of the plug with a refrigerator unit mounted thereon.

Figure 1:
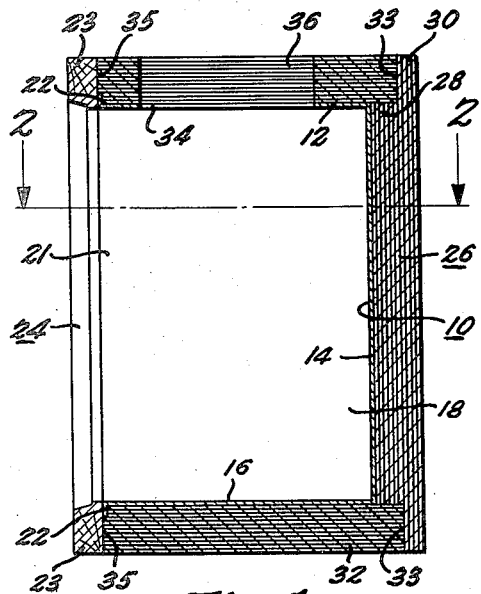
Fig. 1 is a sectional side view of a heat insulated container or compartment embodying one form of the present invention.
Figure 2:
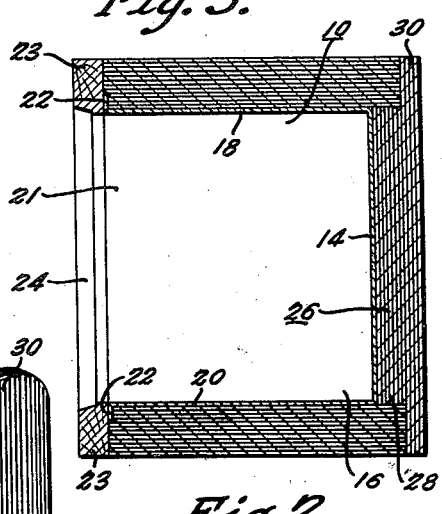
Fig. 2 is a sectional top view taken substantially on the line 2—2 of Fig. 1.

With particular reference to Figs. 1 and 2, a container 10 preferably made of metal has walls such as 12, 14, 16, 18 and 20 and an open end 21. The walls such as 12, 16, 18 and 20 preferably have flanges such as 22 formed thereon adjacent the open end 21, to which flanges a door frame 24 is secured. The wall 14 of the container, opposite the open end thereof, has secured thereto and is covered by a heat insulating wall 26, which wall has a portion 28 that is of substantially the same size and shape as the wall 14 of the container, and a portion 30 larger in its lateral dimensions than the portion 28 so that it extends somewhat beyond the portion 28 on each side. Then, the door frame 24 preferably has portions 23 extending beyond the walls 12, 16, 18 and 20, and preformed layers of heat insulating material are preferably wound upon the remaining exposed outer surfaces of the walls 12, 16, 18 and 20 to form a heat insulating covering 32 intermediate the extending portion 30 of the heat insulating wall 26 and the extending portion 23 of the door frame 24, as well as overlapping the portion 28 of the heat insulating wall 26. The heat insulating wall 26 is preferably made of laminated heat insulating material such as layers of corrugated cardboard, and the layers are preferably sealed together at least at or near their edges by a thin film of a suitable sealing compound such as hydrolene. The wound layers of heat insulating material that form the heat insulating covering 32 are preferably made from a continuously wound strip of heat insulating material such as corrugated cardboard, and the layers are preferably sealed together at or near their edge by a suitable sealing compound such as hydrolene. Then, also, the joints 33 and 35 formed between the covering 32 and heat insulating wall 26, and between the covering 32 and door frame 24 respectively, are preferably sealed with a suitable sealing compound such as hydrolene. The wall 12 of the container has an opening 34 therein that cooperates with an opening 36 through the heating insulating covering 32 for facilitating the insertion and mounting of a temperature control unit.

Figure 3:
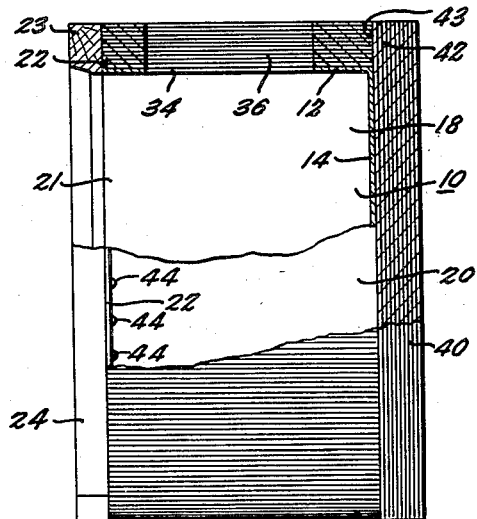
Fig. 3 is a view having fragmentary sections and showing the construction of a modified form of the present invention.

With particular reference to Fig. 3, reference numerals similar to those previously used refer to parts similar to those previously explained. In this modification, however, a heat insulating wall 40 is secured to and covers the wall 14 of the container 10 opposite the open end 21 thereof. End and side portions such as 42 extend beyond the walls 12, 16, 18 and 20 of the container, and the wound covering 32 is wound upon the walls 12, 16, 18 and 20 intermediate the extending portions 42 of the heat insulating wall 40 and the extending portions 23 of the door frame 24. The joint 43 formed between the wall 40 and covering 32 is sealed with a suitable material such as hydrolene. In this view, the flange 22 is shown secured to the door frame 24 by means of screws 44, which securing means is applicable to either this modification or that previously described.

Figure 4:
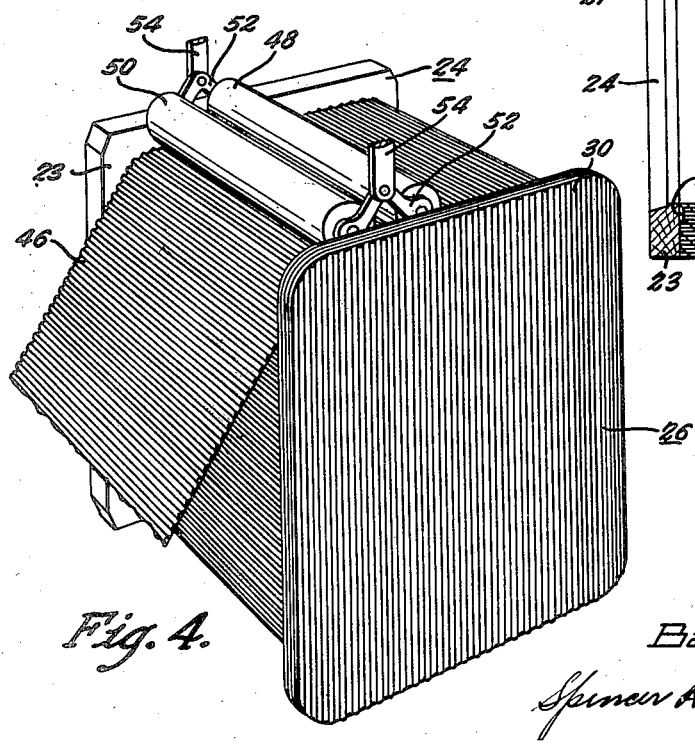
Fig. 4 is a perspective view indicating the construction and a method of assembly utilized in the present invention.

With particular reference to Fig. 4, the door frame 24 and heat insulating wall 26 are shown in position, secured to the container 10. In this view, also, a strip of insulating material 46 is shown being wound upon the container intermediate the door frame 24 and heat insulating wall portion 30. As the strip of heat insulating material 46 is thus wound upon the container 10, rolls 48 and 50 rotatably mounted upon pivotally mounted frame members 52 are preferably urged against the surfaces of the layers as they are wound so as to press the layers together and effect close conformation of the successive layers. The rolls are thus urged through any suitable arms such as 54.

Figure 5:
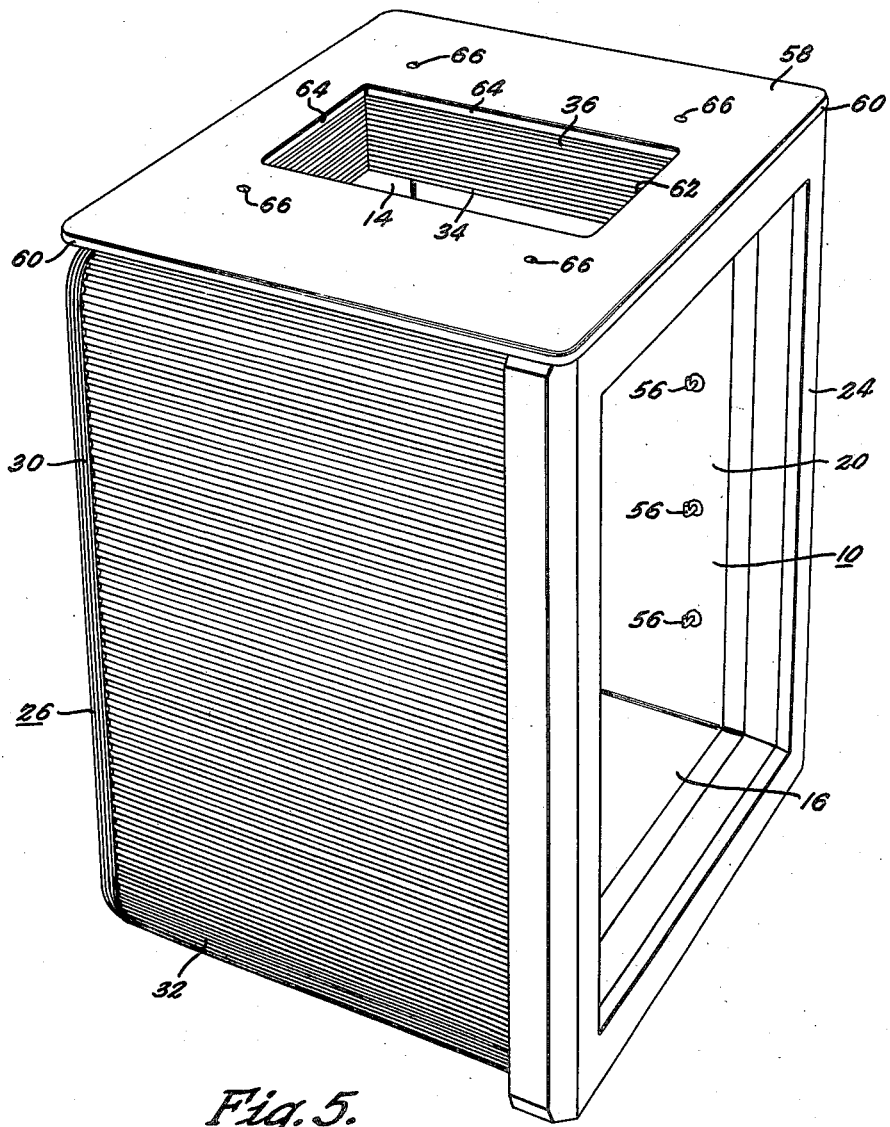
Fig. 5 is a perspective view of an assembled heat insulated compartment or container constructed in accordance with the present invention, and having an opening in one side thereof for facilitating the installation of a temperature control unit.

With particular reference to Fig. 5, the heat insulated compartment is there shown assembled and ready for the installation of a temperature control unit, and to be mounted in a suitable box, mounting or housing. In this view, reference numerals similar to those previously used and described refer to similar parts. Hooks 56 are shown secured to the wall 20 of the container 10, which hooks are provided for the mounting of suitable shelves. The top end of the assembly is preferably covered by a metal plate 58 having flanged edges 60 formed thereon, and an opening 62 therein corresponding and aligned with the opening 34 in the container and the opening 36 in the heat insulating covering 32. The opening 62 preferably has flanged locating edges 64 thereon that substantially conform to the walls of the opening 36. Apertures 66 in the metal plate 58 and aligned with corresponding apertures in the heat insulating covering 32 are provided for the accommodation of mounting bolts and other suitable fastening means for securing an assembly such as that shown in Fig. 8 to the top of the heat insulated container.

Figs. 6 and 7 indicate the construction and details of a preferred form of a plug 70 upon which a temperature control unit for the heat insulated compartment or container may be mounted, and which is preferably adapted to fit into the openings 34, 36 and 64 after the temperature control unit has been mounted thereon as shown in Fig. 8. The plug 70 is preferably built up of layers 72, or laminated heat insulating material such as corrugated cardboard and as indicated in Fig. 6. The side walls such as 74 and 76 of the plug 70 are preferably formed so as to have a draft, so that the top of the plug is somewhat larger than the bottom thereof. The plug is then preferably covered with a wrapping such as 78 which may be secured thereon by strips of gummed paper such as 80. Apertures 82 are provided in the plug 70 for the accommodation of suitable mounting bolts or other fastening means for securing the temperature control unit such as that shown in Fig. 8 to the plug. An aperture 84 is provided for making suitable operating connections between the parts of the temperature control unit.

As best shown in Fig. 8, the plug 70 has secured thereto a temperature control unit in the form of a complete refrigerating unit and comprising a compressor 86 and condenser 88 mounted on the top of the plug, and an evaporator 90 suspended from the bottom of the plug by brackets 92. Suitable operating connections are made between the parts of the refrigerating unit by fluid conducting tubes or pipes 94, 96 and 98, and a valve 100. The tubes or pipes 94 and 96 pass through the aperture 84 that is best shown in Fig. 7. The compressor 86 and condenser 88 are cooled by a fan 102, and a tank or receiver 104 is provided for the collection and storage of liquid refrigerant. The compressor 86 is preferably secured to a metal plate 106 through vibration absorbing members 108 and brackets 110. The plate 106 is preferably provided with flanged edges 112, and has apertures 114 provided therein for alignment with the aperture 66 shown in Fig. 5. Bolts 116 provided with cooperating nuts 118, or other suitable fastening means secure the plate 106, a plate 120 and the bracket 92 to the plug 70. The plate 120 is preferably provided with flanged edges 122 that conform closely to the walls of the plug 70. The plate 120 covers the bottom or inner surface of the plug 70 and preferably matches the container 10 and fits closely within the aperture 34 of that container.

Since the resistance to heat conduction of alternate layers of material is higher than that offered by the materials themselves due to the surface resistance between the materials, the use of layers of laminations of heat insulating material to form a heat insulated wall is a desirable feature. When air forms one of the intervening heat insulating mediums, as in the disclosed preferred form of the present invention, it is desirable to confine the air to relatively small and preferably linear ducts in order to prevent undesirable circulation of the air. Then since a fibrous material paper or cardboard is a good heat insulating material, the use of layers of corrugated fibrous material, such as paper or cardboard, secured and sealed together by a suitable sealing compound such as hydrolene forms an effective heat insulating wall for enclosing a container, to form a heat insulated container or compartment. Another advantage of this structure is that the heat insulating wall may be relatively easily built up or wound so as to effectively insulate the container and yet be relatively inexpensive to manufacture or produce.

The form of the heat insulating wall 26, shown in Figs. 1 and 2, is preferable over that of the wall 40 of Fig. 3, since the portions 28 and 30 form a joint with different parts of the wound heat insulating covering 32 to provide a longer possible heat conductive path, with less possibility of a continuous heat conducting path than is provided by the structure shown in Fig. 3.

The opening 36 is preferably cut in the heat insulating covering 32 after that covering has been applied to the container 10, so that perfect alignment may be effected between the openings 34 and 36. This alignment, as well as the alignment of the openings through the separate layers to form the opening 36, is desirable to reduce to a minimum the heat loss that may be incurred through the joint between the walls of the opening 36 and the walls of the plug 70. The desirability of this method of inserting and mounting a temperature control unit such as refrigerating unit is apparent, since the refrigerating unit may be completely mounted upon the plug 70 and tested before it is installed, and removal for repair is convenient.

In the manufacture or production of this structure, the door frame is secured to the open side of the container and the heat insulating wall 26 is preferably secured to the wall of the container 10 opposite the open side thereof. The wall 26 may be applied or secured thereto in two parts or in one part; that is, the portion 28 may be put in place first, and the portion 30 later applied, or the portions 28 and 30 may be secured and sealed together to form a complete heat insulating wall 26 before that wall is applied to the container. Then too, it is understood that the heat insulating covering 32 may be wound or formed directly upon the walls of the container 10, or upon a form and later applied to the container. However, the preferred method of construction is to wind the layers of heat insulating material that form the heat insulating covering 32 directly upon the container walls after the door frame 24 has been secured to the open side of the container. It is also preferable to apply the sealing compound between the layers of the heat insulating covering 32 as the layers of that covering are wound, and to roll the layers as they are applied so as to press them firmly into place. A pivotally mounted double roller such as that shown in Fig. 4 is preferable for rolling the successive layers of the heat insulating covering.

The plug 70 is then built up in layers of material similar to that used for the heat insulating walls for the container, and the layer secured and sealed together with a suitable sealing compound such as hydrolene. The plug is then wrapped with a suitable material such as paper, and that wrapping secured in place by strips of gummed paper or any suitable fastening means. Either before or after the plug is wrapped, the apertures 82 and 84 are cut or punched therethrough. Then, the temperature control unit or refrigerator unit and the plates 106 and 120 are secured to the plug, and mounted upon the heat insulated container and secured thereto by bolts or other suitable fastening means inserted into the apertures 66 and 114.

While the form of embodiment of the present invention as herein disclosed, constitutes a preferred form, it is to be understood that other forms might be adopted, all coming within the scope of the claims which follow.

What is claimed is as follows:

1. A heat insulated container comprising, in combination, a container having side walls, a back and an open side; a door frame secured to the container adjacent the open side thereof and having portions extending beyond said side walls; a wall of heat insulating material secured to the back and comprising layers of heat insulating material secured together, said wall of heat insulating material also having portions extending beyond said side walls so that said side walls and said extending portions define a channel; a heat insulating covering for the side walls comprising a continuous strip of corrugated heat insulating material wrapped around the side walls in said channel so that joints are effected between said extending portions and the heat insulating covering; and means sealing the joints so that static air is confined in the corrugations.

2. A heat insulated container comprising, in combination, a container having side walls, a back and an open side; a door frame secured to the container adjacent the open side thereof and having portions extending beyond said side walls; a wall of heat insulating material secured to the back and comprising layers of heat insulating material secured together, said wall of heat insulating material also having portions extending beyond said side walls so that said side walls and said extending portions define a channel; a heat insulating covering for the side walls comprising a continuous strip of corrugated heat insulating material wrapped around the side walls in said channel so that joints are effected between said extending portions and the heat insulating covering; sealing compound intermediate the layers of the wrapped heat insulating material for holding the layers tightly together; and means sealing the joints so that static air is confined in the corrugations.

3. A heat insulated container comprising, in combination, a container having side walls, a back and an open side; a door frame secured to the container adjacent the open side thereof and having portions extending beyond said side walls; a wall of heat insulating material secured to the back and comprising layers of heat insulating material secured together, said wall of heat insulating material also having portions extending beyond said side walls so that said side walls and said extending portions define a channel; a heat insulating covering for the side walls comprising a continuous strip of corrugated heat insulating material wrapped around the side walls in said channel so that joints are effected between said extending portions and the heat insulating covering; sealing compound intermediate the layers of the wrapped heat insulating material and near the edges of said layers for sealing said layers together; and means sealing the joints so that static air is confined in the corrugations.

BAYARD D. KUNKLE.